United States Patent
von Hippel et al.

[11] Patent Number: 5,980,838
[45] Date of Patent: Nov. 9, 1999

[54] REACTOR HEAD FOR A MONOLITHIC CO-CURRENT OR COUNTERCURRENT REACTOR

[75] Inventors: Lukas von Hippel, Alzenau, Germany; Dietrich Arntz, Mobile, Ala.; Jörg Frauhammer, Gemmrigheim, Germany; Gerhart Eigenberger, Neustadt, Germany; Gerhard Friedrich, Illingen, Germany

[73] Assignee: Degussa-Huls Aktiengesellschaft, Frankfurt am Main, Germany

[21] Appl. No.: 08/988,427

[22] Filed: Dec. 10, 1997

[30] Foreign Application Priority Data

Dec. 21, 1996 [DE] Germany .............. 196 53 989

[51] Int. Cl.$^6$ ...................................... B01J 8/00
[52] U.S. Cl. .................. 422/197; 422/198; 422/202; 422/211; 422/222
[58] Field of Search ...................... 422/200, 201, 422/202, 203, 198, 197, 196, 191, 173, 211, 222

[56] References Cited

U.S. PATENT DOCUMENTS

| | | | |
|---|---|---|---|
| 2,382,255 | 8/1945 | Pyzel | 422/197 |
| 2,638,407 | 5/1953 | Steeves | 422/197 |
| 4,221,763 | 9/1980 | Greene | 422/197 |

*Primary Examiner*—Hien Tran
*Attorney, Agent, or Firm*—Smith, Gambrell & Russell, LLP; Beveridge, DeGrandi, Weilacher & Young

[57] ABSTRACT

Reactor heads for the feed and withdrawal of a fuel gas/air mixture and of an educt gas mixture into the heating ducts and reaction ducts respectively of a monolithic countercurrent reactor. The reactor heads are provided with guide pipes, which feed the gas mixtures into the ducts assigned to them and withdraw them from these ducts.

2 Claims, 2 Drawing Sheets

⊗ fuel gas/air mixture flowing into the plane of the drawing

⊙ reaction gas mixture flowing out of the plane of the drawing

REACTOR HEAD FOR A MONOLITHIC CO-CURRENT OR COUNTERCURRENT REACTOR

INTRODUCTION AND BACKGROUND

The present invention relates to a reactor head for a monolithic co-current or countercurrent reactor.

Co-current or countercurrent reactors are described in the previously unpublished European Patent Application EP 0 752 390 A1.

A co-current or countercurrent reactor has the form of a cylinder of any cross-sectional area and is traversed by parallel flow ducts which connect the two end faces of the reactor to one another. Such a device is generally referred to as a honeycomb system. It may be manufactured from metal or ceramic. The cross-section of the flow ducts may be triangular, square, rectangular, hexagonal or of some other shape. The number of flow ducts in relation to the cross-sectional area is referred to as the cell density.

EP 0 752 390 A1 describes such a honeycomb system for the production of hydrocyanic acid by the reaction of methane and ammonia in the presence of a suitable catalyst. The reaction of methane and ammonia is an endothermic reaction and is carried out at temperatures of 1000° C. to 1350° C.

According to EP 0 752 390 A1, the flow ducts of the honeycomb system are subdivided into heating ducts and reaction ducts. Heating ducts and reaction ducts are distributed in a complementary pattern over the cross-section of the honeycomb system. The pattern of distribution of the ducts may in principle be chosen at random, but an arrangement of alternating heating ducts and reaction ducts in layers or rows has proved to be successful. The reaction mixture of methane and ammonia is passed through the reaction ducts. A fuel gas/air mixture is passed through the heating ducts in a co-current or countercurrent direction to the reaction mixture and is introduced into the ducts for the combustion. Because of the immediate proximity of the heating ducts and the reaction ducts, the heat liberated during combustion is efficiently transferred to the reactants. In order to carry out the catalytic conversion, the inside walls of the reaction ducts are coated with a catalyst for the catalytic conversion.

The combustion in the heating ducts is ignited by heating wires introduced into the ducts. The ignition of the combustion in the heating ducts may however also be effected catalytically. To this end the surfaces of the inside walls of the heating ducts can be coated with a catalyst for the catalytic combustion.

A fundamental problem of the reactor concept as presented heretofore is the feed of the reaction gases and of the combustion gases into each of the ducts assigned to them. One possibility of feeding these gases into the ducts is disclosed in U.S. Pat. No. 4,271,110 for the case of an indirect heat exchanger in the form of a honeycomb body. On the assumption that heating ducts and reaction ducts are arranged alternately in layers or rows, the feed and removal of the gases may be effected according to the above U.S. patent in the following manner:

The fuel gas/air mixture is passed to one end face of the reactor with the aid of a conical connecting pipe attached to the end face. The reaction mixture is passed to the second end face in a corresponding manner. The flow ducts are closed in the axial direction on the end face opposite to the respective inlet end face in order to prevent mixing of the two gaseous flows. The withdrawal of the gas flows is effected through the lateral faces of the reactor. To this end, starting from one lateral face, the reactor has incorporated within it openings which connect all the ducts of one layer with one another. The gas flows issuing from the individual layers can be combined by attaching a connecting gas pipe to the lateral face of the reactor.

This solution to the problem of introducing the gases is unsatisfactory on account of its limited flexibility, as it can be applied only to reactors having heating ducts and reaction ducts arranged in layers. It has moreover been found that the stability of the combustion in the ducts is unsatisfactory.

It is accordingly an object of the present invention to overcome the shortcomings and drawbacks of prior known co-current and countercurrent reactors.

A further object of this invention is to enable introduction of the heating gases and reaction gases into the appropriate ducts of co-current and countercurrent reactors; even though heating ducts and reaction ducts may be arranged in any pattern over the cross-section of the reactor.

SUMMARY OF THE INVENTION

The above as well as other objects of the invention are fulfilled by a reactor head for the feed and withdrawal of two fluid media I and II flowing through parallel flow ducts of a monolithic co-current or countercurrent reactor, wherein the reactor has the form of a cylinder and the parallel flow ducts connect the two end faces of the reactor with one another. Medium I flows through a first set of flow ducts and medium II flows through a second set of flow ducts. Each end of the reactor according to the invention is fitted with a component having two chambers arranged one on top of the other having a common separating wall between them thereby forming an innermost chamber and as outermost chamber. The innermost chamber has an outside wall opposite the common separating wall with which the reactor head lies in gas-tight contact on an end face of the reactor.

The reactor head according to the invention can generally be used for introducing two fluid media into the flow ducts assigned to them in a monolithic honeycomb system. In the honeycomb system two sets of flow ducts, which may be arranged in any pattern over the cross-section of the honeycomb system, are assigned to the two fluid media. The invention is not limited to an arrangement of the ducts in layers. To feed in both media it is necessary to have two reactor heads, which are tightly attached on the opposite end faces of the reactor.

BRIEF DESCRIPTION OF DRAWINGS

The present invention will be further understood with reference to the accompanying drawings, wherein.

DETAILED DESCRIPTION OF INVENTION

Figure 1:
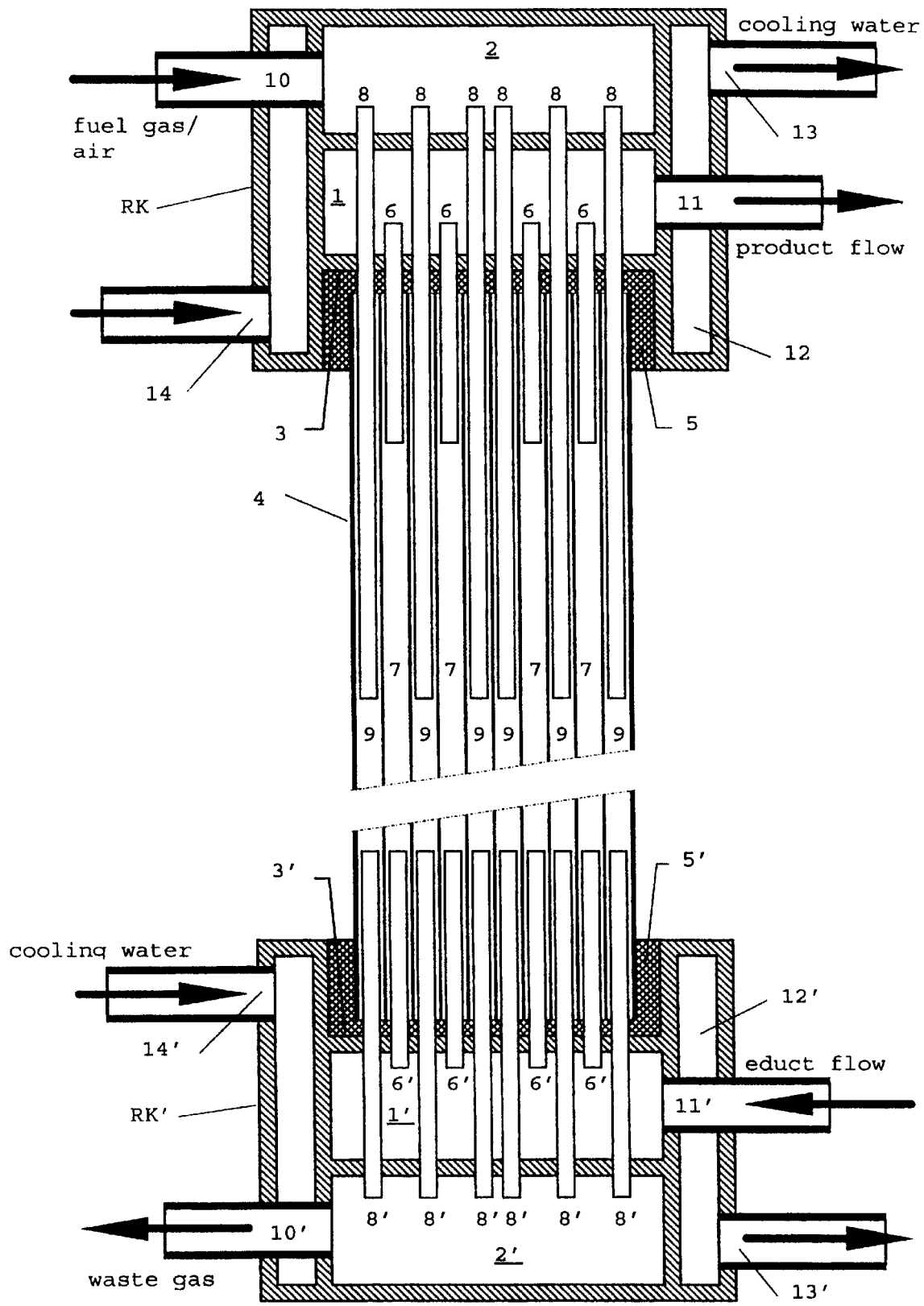
FIG. 1 is a schematic cross sectional view of a reactor head according to the present invention.

The present invention will now be described in further detail with reference to FIG. 1 which shows a schematic representation of a reactor head according to the invention for the feed and withdrawal of two fluid media I and II flowing through parallel flow ducts of a monolithic co-current or countercurrent reactor. As shown in FIG. 1, the reactor has the form of a cylinder of length L and the parallel flow ducts connect the two end faces of the reactor with one another. Medium I flows through a first set of flow ducts 7 and medium II flows through a second set of flow ducts 9.

It is a feature of the present invention that the reactor head has two chambers 1, 2 and 1', 2' respectively, an innermost 1,1' and an outermost 2,2' at each end, arranged one on top of the other and having a common separating wall and that the chamber 1 and 1' respectively, having an outside wall 3 and 3' respectively, opposite the common separating wall lies in gas-tight contact on an end face of the reactor 4. Guide pipes 8, 6 and 8', 6' respectively are provided, which are introduced into the flow ducts of the reactor 4 to a maximum distance of one half the length L of the reactor, with the guide pipes 6 and 6' respectively, of the first set of flow ducts 7 terminating in chamber 1 and 1' respectively, and with the guide pipes 8 and 8' respectively, of the second set of flow ducts 9 passing through the chamber 1 and 1' respectively, and the common separating wall and terminating in the chamber 2 and 2' respectively. The chambers 1, 2 and 1', 2' respectively, have connecting pipes 10, 11 and 10', 11' respectively, for the feed and withdrawal of medium I and of medium II.

In an even more detailed aspect of the invention, the jacket surface of the reactor head RK and RK' respectively, is designed as a double jacket 12 and 12' respectively, which has an inlet 14 and 14' respectively, and an outlet 13 and 13' respectively, for a cooling medium.

The operation of the reactor head of the present invention will now be described in detail. FIG. 1 shows a monolithic countercurrent reactor 4 having reactor heads RK and RK' mounted on the end faces.

The fuel gas/air mixture is passed to the chamber 2 of the reactor head RK via the connecting pipes 10. From the chamber 2 the fuel gas/air mixture reaches the heating ducts 9 of the monolithic reactor via the flame-supporting pipes or guide pipes 8. There the mixture is subjected to catalytic combustion by a combustion catalyst which is present as a coating on the inside walls of the heating ducts. The waste gases reach the chamber 2' of the second reactor head RK' via the guide pipes 8' and are led away to the outside via the connecting pipes 10'.

The educt flow is passed through the reactor in countercurrent flow to the fuel gas/air mixture. For this purpose, the educt flow is introduced into the chamber 1' via connecting pipes 11' and is fed into the reaction ducts 7 of the reactor by means of the guide pipes 6'. The inside walls of the reaction ducts are coated with a catalyst for the required catalytic reaction. The catalyst brings about the conversion of the educt flow into the product flow, which is transferred out via the guide pipes 6, chamber 1 and connecting pipes 11.

Both reactor heads are provided with a cooling jacket 12 and 12' respectively. The cooling water is passed through the connecting pipes 14, 14' to the cooling jackets 12, 12' and led away through the connecting pipes 13, 13'. The reactor heads are mounted with the outside walls 3 and 3' respectively of the chambers 1 and 1' in gas-tight contact with the end face of the reactor 4. A sealing composition 5 and 5' is provided to seal the heads. The sealing material can be a silicone adhesive which is resistant to the prevailing temperatures of at most 200° C. at the end faces.

Figure 2:
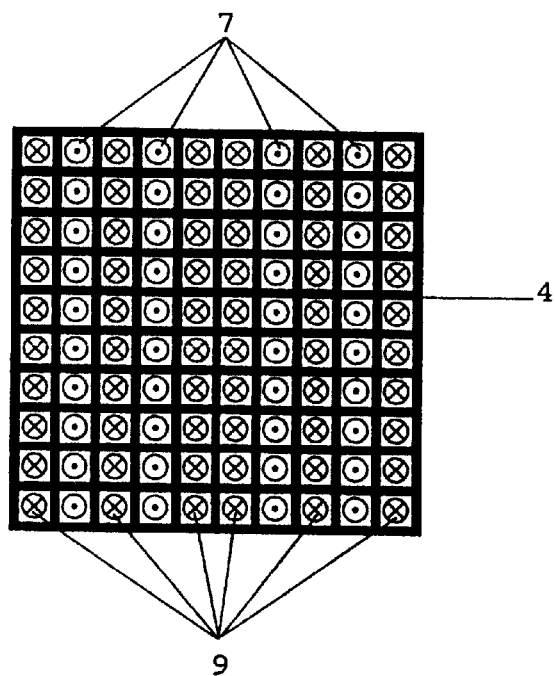
FIG. 2 is a schematic cross-sectional view of the heating ducts and reaction ducts of a countercurrent reactor according to the invention.

FIG. 2 shows a cross-section through the monolithic countercurrent reactor 4 with the heating ducts 9 and the reaction gas ducts 7 arranged in layers. The reactor is manufactured from a gas-tight aluminum oxide ceramic.

In the drawing the symbol ⊗ indicates fuel gas/air mixture flowing into the plane of the drawing and the symbol ⊙ indicates reaction gas mixture flowing out of the plane of the drawing.

The guide pipes serve to ensure that the fluid media are fed into the respective ducts. The length of their immersion into the ducts may be freely chosen within wide limits according to requirements. Where the honeycomb system is used as a countercurrent flow reactor for endothermic catalytic reactions, by a suitable choice of the length of immersion it can be ensured that critical processes proceed only deep down in the interior of the reactor and consequently that any seals between the reactor head and the honeycomb system are not destroyed. As an additional precaution, the reactor head may be surrounded by a protective double jacket, through which a cooling liquid is pumped.

The length of immersion of the guide pipes for the reaction gases is chosen preferably within the limits of between 0 and 10% of the length of the reactor. The guide pipes for the fuel gas/air mixture assume in addition the function of flame-supporting pipes and therefore ensure a stable combustion. Moreover, the place at which combustion commences can be predetermined by the length of immersion. The preferred range for the length of immersion is in this case between 0 and 50% of the length L of the reactor.

The reactor head according to the invention also renders possible the introduction of measuring probes into individual ducts of the reactor. For this, only the corresponding guide pipe need be passed through both chambers to the outside. A particular advantage of the reactor head is the fact that it allows the feeding of the two fluid media into ducts distributed in any pattern over the cross-section of the reactor.

The reactor head may be manufactured from various materials. The actual selection of the material depends on the intended application. Determining factors for the selection are the media to be handled and the temperatures and pressures arising during the operation. Reactor heads made of stainless steel have proved successful for the synthesis of hydrocyanic acid. The guide pipes, in particular the flame-supporting pipes, are exposed to high thermal loads. For this reason, besides flame-supporting pipes made of stainless steel, the use of flame-supporting pipes made of ceramic materials is also preferred. For the rapid and easy replacement of flame-supporting pipes which have been damaged by heat, it is useful to design the pipes in two parts with a socket connection. The end pieces of the flame-supporting pipes entering the reactor can then be easily replaced if necessary.

Further variations and modifications of the foregoing will be apparent to those skilled in the art and are intended to be encompassed by the claims appended hereto.

German application 196 53 989.7 is relied on and incorporated herein by reference.

We claim:

1. A reactor head system for the feed and withdrawal of two fluid media flowing through parallel flow ducts of a monolithic co-current or countercurrent reactor, comprising a reactor in the form of a cylinder of a length L having an end face at each end thereof and a plurality of parallel flow ducts connecting two end faces of said reactor with one another, said plurality of parallel flow ducts consisting of a first set of flow ducts and a second set of flow ducts, a reactor head disposed at each end of the reactor, each said reactor head comprising two chambers arranged one on top of the other having a common separating wall, one of said chambers being innermost having an outside wall opposite the common separating wall lying in gas-tight contact on an end face of the reactor, and a plurality of guide pipes which are introduced into said flow ducts of said reactor to a maximum distance of one half the length L of the reactor, wherein the guide pipes for the first set of flow ducts terminate in the innermost chamber and the guide pipes of the second set of flow ducts passing through the innermost chamber and the common separating wall and terminating in the second of the two chambers, the second chamber being outermost and the two chambers having connecting pipes for the feed and withdrawal of a first medium and a second medium.

2. The reactor head system according to claim 1, wherein each said reactor head further comprises a jacket surrounding the two chambers, said jacket being a double jacket which has an inlet and an outlet for a cooling medium.

* * * * *